US012782492B2

(12) United States Patent
Bayesteh et al.

(10) Patent No.: US 12,782,492 B2
(45) Date of Patent: Nov. 3, 2026

(54) METHODS AND APPARATUSES FOR CONCURRENT ENVIRONMENT SENSING AND DEVICE SENSING

(71) Applicant: HUAWEI TECHNOLOGIES CO., LTD., Shenzhen (CN)

(72) Inventors: Alireza Bayesteh, Kanata (CA); Ahmed Wagdy Shaban, Kanata (CA); Navid Tadayon, Kanata (CA); Jianglei Ma, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 18/603,153

(22) Filed: Mar. 12, 2024

(65) Prior Publication Data

US 2024/0219510 A1 Jul. 4, 2024

Related U.S. Application Data

(63) Continuation of application No. PCT/CN2021/119471, filed on Sep. 18, 2021.

(51) Int. Cl.
*G01S 5/02* (2010.01)

(52) U.S. Cl.
CPC ...... *G01S 5/02525* (2020.05); *G01S 5/02523* (2020.05); *G01S 5/02529* (2020.05)

(58) Field of Classification Search
CPC ................ H04W 24/10; G01S 5/02523; G01S 5/02525; G01S 5/0036
See application file for complete search history.

(56) References Cited

U.S. PATENT DOCUMENTS

2002/0154616 A1* 10/2002 Aoyama ................ H04B 1/707 370/335
2019/0223140 A1 7/2019 Grossmann et al.
2021/0041522 A1 2/2021 Manolakos et al.
2021/0143879 A1* 5/2021 Ji ......................... H04B 7/0626
2022/0173857 A1* 6/2022 Michalopoulos .... H04B 17/327
2022/0279367 A1* 9/2022 Hwang ................. H04W 24/08
2023/0319772 A1* 10/2023 Alawieh ............... G01S 5/0009 455/456.1
2023/0370222 A1* 11/2023 Zheng ................... H04L 5/0048

FOREIGN PATENT DOCUMENTS

EP 3739356 A1 11/2020

OTHER PUBLICATIONS

3GPP TSG RAN WG1 #105-e R1-2104741 "Enhancements for DL-AoD Positioning", OPPO, e-Meeting, May 10-27, 2021, total 8 pages.

* cited by examiner

*Primary Examiner* — Barry W Taylor
(74) *Attorney, Agent, or Firm* — Slater Matsil, LLP

(57) ABSTRACT

Some embodiments of the present disclosure provide a manner to enabling high-resolution sensing, localization, imaging, and environment reconstruction capabilities in a wireless communication system. A radio frequency (RF) map of the environment includes coarse location and orientation information for at least one reflector and at least one targeted device of the wireless communication system. A fine sensing procedure may involve using the information in the RF map to carry out sensing in a more limited region of the environment. The second stage may employ a sensing signal configuration provided to at least one device to be sensed in the limited region, so that the at least one device may assist in the sensing.

20 Claims, 12 Drawing Sheets

METHODS AND APPARATUSES FOR CONCURRENT ENVIRONMENT SENSING AND DEVICE SENSING

CROSS REFERENCE TO RELATED APPLICATION

This application is a continuation of International Application No. PCT/CN2021/119471, filed on Sep. 18, 2021, the disclosure of which is hereby incorporated by reference in its entirety.

TECHNICAL FIELD

The present disclosure relates, generally, to sensing in wireless mobile networks and, in particular embodiments, to concurrent environment sensing and device sensing.

BACKGROUND

Following extensive implementation of fifth generation (5G) and sixth generation (6G) wireless communication systems, novel, disruptive applications and use cases are expected. These novel applications and use cases may include autonomous vehicles (unmanned mobility) and extended reality. These novel applications and use cases may, accordingly, necessitate a development of high-resolution sensing, localization, imaging and environment reconstruction capabilities. These high-resolution sensing, localization, imaging and environment reconstruction capabilities may be specifically configured to meet stringent communication performance requirements and spectrum demands of these novel applications and use cases.

SUMMARY

Aspects of the present application relate to enabling high-resolution sensing, localization, imaging and environment reconstruction capabilities. In particular, aspects of the present application relate to sensing an environment and devices in the environment. Conveniently, aspects of the present application may be shown to tackle problems, such as NLOS-bias and synchronization errors, of known sensing techniques. Aspects of the present application relate to obtaining relatively high-resolution location information about a user equipment (UE) and, concurrently, sensing the environment. Additional aspects of the present application relate to obtaining other information about the UE, such as UE orientation, UE velocity vector and UE channel subspace. The UE may assist the sensing of itself and the environment. In particular, the UE may receive configuration information about a spatial domain signal, receive the spatial domain signal, estimate a sensing measurement parameter for the received spatial domain signal and transmit, to the network entity that is performing the sensing, an indication of the sensing measurement parameter.

In one example, a first, coarse sensing, stage may involve broadly sensing an environment and determining coarse location for devices and reflectors. A second, fine sensing, stage may involve using the information gained in the first stage to carry out sensing in a more limited region. The second stage may employ a sensing signal configuration provided to at least one device to be sensed in the limited region, so that the at least one device may assist in the sensing.

Given the challenges of spectrum scarcity, low cost and energy footprint constraints, and exigent performance requirements, a wireless network paradigm having separate communication and sensing systems is no longer effective.

Integration of communication and sensing is not merely limited to sharing the same resource in time, frequency, space, and sharing the hardware; such integration also includes the co-design of communication and sensing functionalities and the joint optimized operations. Integration of communication and sensing may be shown to lead to gains in terms of spectral efficiency, energy efficiency, hardware efficiency and cost efficiency. For instance, large dimensionalities of the massive multiple input multiple output technologies and millimeter Wave (mmWave) technologies, in terms of space and spectrum, may be utilized to provide high-data rate communications in addition to high-resolution environment imaging, sensing, and localization.

According to an aspect of the present disclosure, there is provided a method for a user equipment. The method comprises receiving, from a network device: a configuration for a sensing reference signal, the sensing reference signal comprising a plurality of spatial domain signals; and a configuration for identifying at least two spatial domain signals among the plurality of spatial domain signals. The method comprises receiving the at least two spatial domain signals among the plurality of sensing reference signals. The method comprises estimating at least one sensing measurement parameter for each of the at least two received spatial domain signals of among the plurality of spatial domain signals. Each of the at least one estimated sensing measurement parameter is associated with the respective received spatial domain signal based on the received configuration for the sensing reference signal. The method comprises transmitting, to the network device: an indication of the at least one estimated sensing measurement parameter of each of the at least one received spatial domain signals; and an indication for associating each of the at least one estimated sensing measurement parameter with the respective received spatial domain signal.

In some examples of the above aspect, the at least one sensing measurement parameter comprises an arrival direction vector corresponding to an angle of arrival of the respective spatial domain signal. In some examples of the above aspect, the at least one sensing measurement parameter comprises a radial Doppler frequency for the arrival direction vector. In some examples of the above aspect, the at least one sensing measurement parameter comprises a complex coefficient for the arrival direction vector. In some examples of the above aspect, the at least one sensing measurement parameter comprises a time of arrival of the respective spatial domain signal.

In some examples of the above aspect, estimating the at least one sensing measurement parameter comprises measuring a respective at least one parameter of the respective spatial domain signal.

In some examples of the above aspect, the sensing reference signal comprises the plurality of spatial domain signals multiplexed in a code domain. In some examples of the above aspect, each of the spatial domain signals is a different chirp signal. In some examples of the above aspect, each of the spatial domain signals corresponds to a different Zadoff-Chu sequence. In some examples of the above aspect, the sensing reference signal comprises the plurality of spatial domain signals multiplexed in a time domain.

In some examples of the above aspect, the method further comprises obtaining information about positions of an actual transmitter and a virtual transmitter corresponding to each of the at least two received spatial domain signals. the virtual transmitter position is a position of the actual transmitter mirrored around a plane of reflection corresponding to: the transmitter, a respective reflector, and the user equipment. The method further comprises generating information about at least one of: a position of the user equipment, an orientation of the user equipment, and a velocity of the user equipment. The generating is based on: the obtained information about the positions of the actual transmitter and the virtual transmitter; and the at least one estimated sensing measurement parameter associated with each of the at least two received spatial domain signals.

According to another aspect of the present disclosure, there is provided a method for a network device. The method comprises transmitting, to a user equipment, a configuration for a sensing reference signal. The sensing reference signal comprises a plurality of spatial domain signals, and the configuration is for identifying at least two of the spatial domain signals. The method comprises transmitting the at least two spatial domain signals of the sensing reference signal. The method comprises receiving, from the user equipment, an indication of at least one sensing measurement parameter for each of the at least two spatial domain signals of the sensing reference signal, and an indication for associating each of the at least one estimated sensing measurement parameter with the respective spatial domain signal. Each of the at least one estimated sensing measurement parameter is associated with the respective spatial domain signal based on the transmitted configuration for the sensing reference signal.

In some examples of the above aspect, the at least one sensing measurement parameter comprises an arrival direction vector corresponding to an angle of arrival of the respective spatial domain signal. In some examples of the above aspect, the at least one sensing measurement parameter comprises a radial Doppler frequency for the arrival direction vector. In some examples of the above aspect, the at least one sensing measurement parameter comprises a complex coefficient for the arrival direction vector. In some examples of the above aspect, the at least one sensing measurement parameter comprises a time of arrival of the respective spatial domain signal.

In some examples of the above aspect, the sensing reference signal comprises the plurality of spatial domain signals multiplexed in a code domain. In some examples of the above aspect, each of the spatial domain signals is a different chirp signal. In some examples of the above aspect, each of the spatial domain signals corresponds to a different Zadoff-Chu sequence. In some examples of the above aspect, the sensing reference signal comprises the plurality of spatial domain signals multiplexed in a time domain.

In some examples of the above aspect, the method further comprises obtaining a position of at least one reflector associated with one of the at least two spatial domain signals. The method further comprises determining at least one of a position, a velocity, or an orientation of the user equipment based on: the received indication of the at least one channel measurement parameter for each of the at least two spatial domain signals of the sensing reference signal, and the position of the at least one reflector. The indication of the at least one channel measurement parameter for each of the at least two spatial domain signals of the sensing reference signal is for associating each of the at least one estimated channel measurement parameter with the respective spatial domain signal.

In some examples of the above aspect, the method further comprises determining a position of at least one virtual transmitter corresponding to the at least one reflector. Each virtual transmitter position is a position of a transmitter of the network device mirrored around a respective plane of reflection corresponding to: the transmitter; a respective reflector; and the user equipment. Determining at least one of the position, the velocity, or the orientation of the user equipment is further based on the position of the at least one virtual transmitter.

In some examples of the above aspect, the method further comprises transmitting, to the user equipment, information about positions of the transmitter of the network device and the at least one virtual transmitter. The positions correspond to each of the at least two spatial domain signals. The method further comprises receiving, from the user equipment, information about at least one of: a position of the user equipment, an orientation of the user equipment, and a velocity of the user equipment. The information is based on the positions of the transmitter of the network device and the virtual transmitter, and based on the at least one sensing measurement parameter associated with each of the at least two spatial domain signals.

In some examples of the above aspect, obtaining the position of the at least one reflector comprises receiving at least one reflection of the at least two transmitted spatial domain signals of the sensing reference signal.

In some examples of the above aspect, the method further comprises obtaining, based on a radio frequency map of the environment, a subspace for sensing the user equipment. The subspace comprises the at least two spatial domain signals of the plurality of spatial domain signals.

According to another aspect of the present disclosure, there is provided an apparatus comprising a processor and a non-transitory computer-readable storage medium comprising instructions which, when executed by the processor, cause the apparatus to carry out any one of the preceding methods.

According to another aspect of the present disclosure, there is provided a computer program product comprising instructions which, when the program is executed by a computer, cause the computer to carry out any one of the preceding methods.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
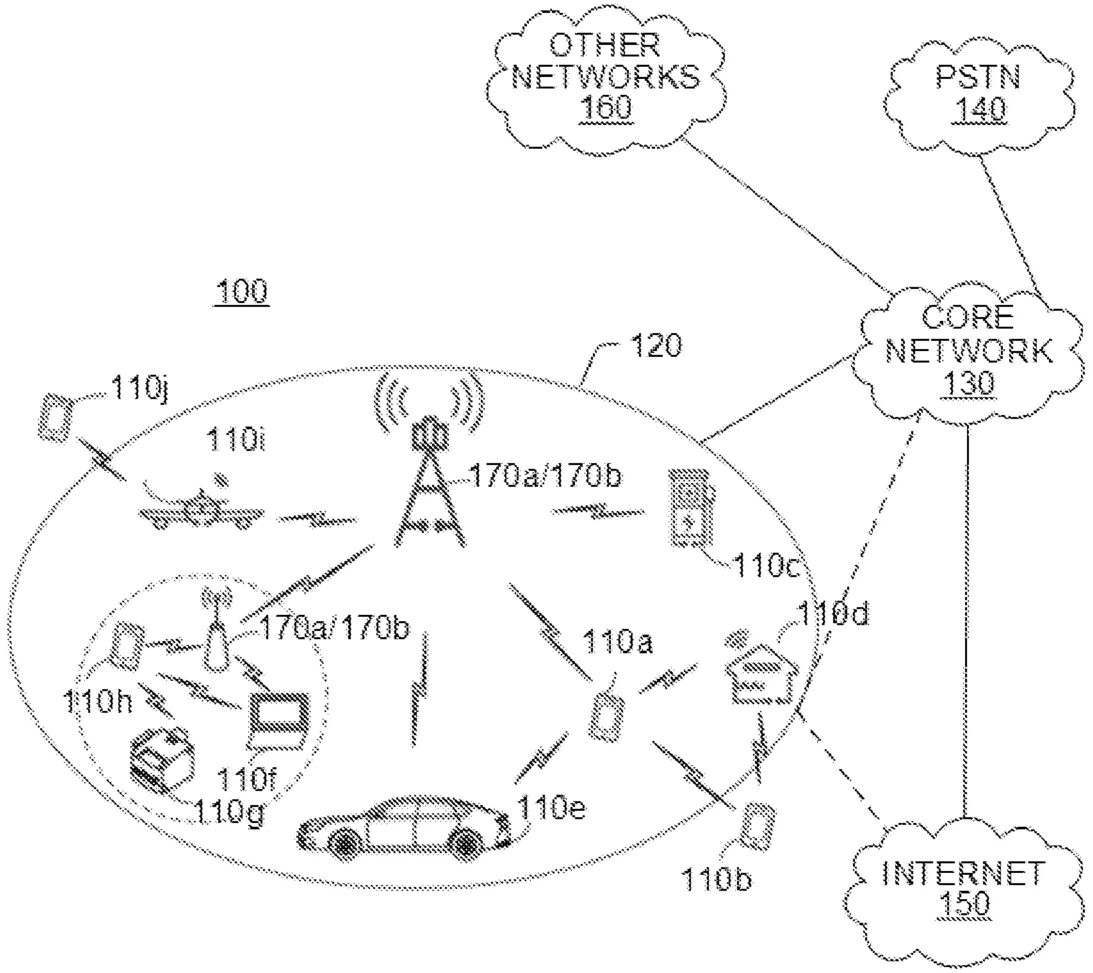
FIG. 1 illustrates, in a schematic diagram, a communication system in which embodiments of the disclosure may occur, the communication system includes multiple example electronic devices and multiple example transmit receive points along with various networks.

Referring to FIG. 1, as an illustrative example without limitation, a simplified schematic illustration of a communication system is provided. The communication system 100 comprises a radio access network 120. The radio access network 120 may be a next generation (e.g., sixth generation, "6G," or later) radio access network, or a legacy (e.g., 5G, 4G, 3G or 2G) radio access network. One or more communication electric device (ED) 110*a*, 110*b*, 110*c*, 110*d*, 110*e*, 110*f*, 110*g*, 110*h*, 110*i*, 110*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
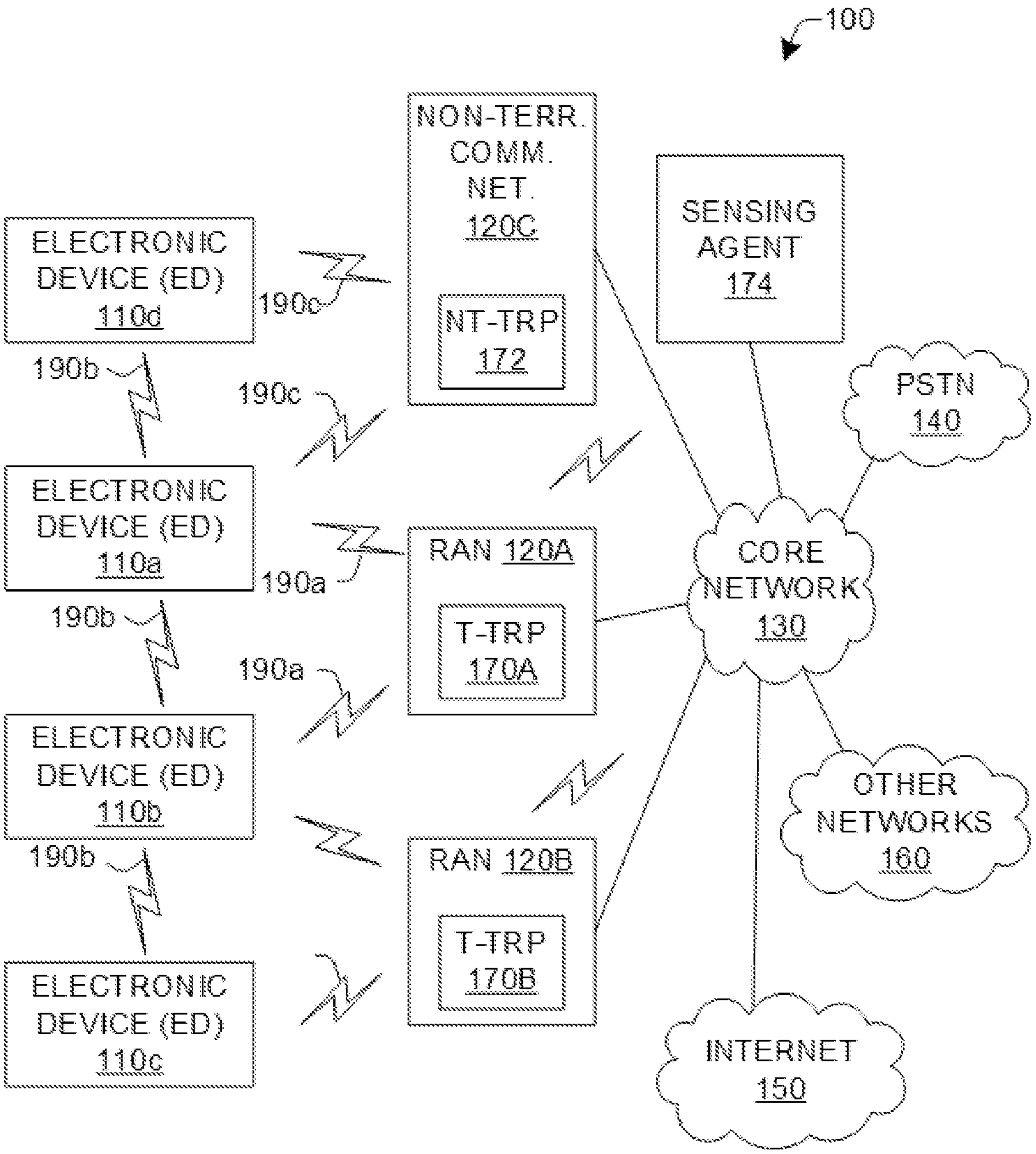
FIG. 2 illustrates, in a block diagram, the communication system of FIG. 1, the communication system includes multiple example electronic devices, an example terrestrial transmit receive point and an example non-terrestrial transmit receive point along with various networks.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing and faster physical layer link switching between terrestrial networks and non-terrestrial networks.

The terrestrial communication system and the non-terrestrial communication system could be considered sub-systems of the communication system. In the example shown in FIG. 2, the communication system 100 includes electronic devices (ED) 110*a*, 110*b*, 110*c*, 110*d* (generically referred to as ED 110), radio access networks (RANs) 120*a*, 120*b*, a non-terrestrial communication network 120*c*, a core network 130, a public switched telephone network (PSTN) 140, the Internet 150 and other networks 160. The RANs 120*a*, 120*b* include respective base stations (BSs) 170*a*, 170*b*, which may be generically referred to as terrestrial transmit and receive points (T-TRPs) 170*a*, 170*b*. The non-terrestrial communication network 120*c* includes an access node 172, which may be generically referred to as a non-terrestrial transmit and receive point (NT-TRP) 172.

Any ED 110 may be alternatively or additionally configured to interface, access, or communicate with any T-TRP 170*a*, 170*b* and NT-TRP 172, the Internet 150, the core network 130, the PSTN 140, the other networks 160, or any combination of the preceding. In some examples, the ED 110*a* may communicate an uplink and/or downlink transmission over a terrestrial air interface 190*a* with T-TRP 170*a*. In some examples, the EDs 110*a*, 110*b*, 110*c* and 110*d* may also communicate directly with one another via one or more sidelink air interfaces 190*b*. In some examples, the ED

110*d* may communicate an uplink and/or downlink transmission over an non-terrestrial air interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), space division multiple access (SDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The non-terrestrial air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs 110 and one or multiple NT-TRPs 175 for multicast transmission.

The RANs 120*a* and 120*b* are in communication with the core network 130 to provide the EDs 110*a*, 110*b*, 110*c* with various services such as voice, data and other services. The RANs 120*a* and 120*b* and/or the core network 130 may be in direct or indirect communication with one or more other RANs (not shown), which may or may not be directly served by core network 130 and may, or may not, employ the same radio access technology as RAN 120*a*, RAN 120*b* or both. The core network 130 may also serve as a gateway access between (i) the RANs 120*a* and 120*b* or the EDs 110*a*, 110*b*, 110*c* or both, and (ii) other networks (such as the PSTN 140, the Internet 150, and the other networks 160). In addition, some or all of the EDs 110*a*, 110*b*, 110*c* may include functionality for communicating with different wireless networks over different wireless links using different wireless technologies and/or protocols. Instead of wireless communication (or in addition thereto), the EDs 110*a*, 110*b*, 110*c* may communicate via wired communication channels to a service provider or switch (not shown) and to the Internet 150. The PSTN 140 may include circuit switched telephone networks for providing plain old telephone service (POTS). The Internet 150 may include a network of computers and subnets (intranets) or both and incorporate protocols, such as Internet Protocol (IP), Transmission Control Protocol (TCP), User Datagram Protocol (UDP). The EDs 110*a*, 110*b*, 110*c* may be multimode devices capable of operation according to multiple radio access technologies and may incorporate multiple transceivers necessary to support such.

Figure 3:
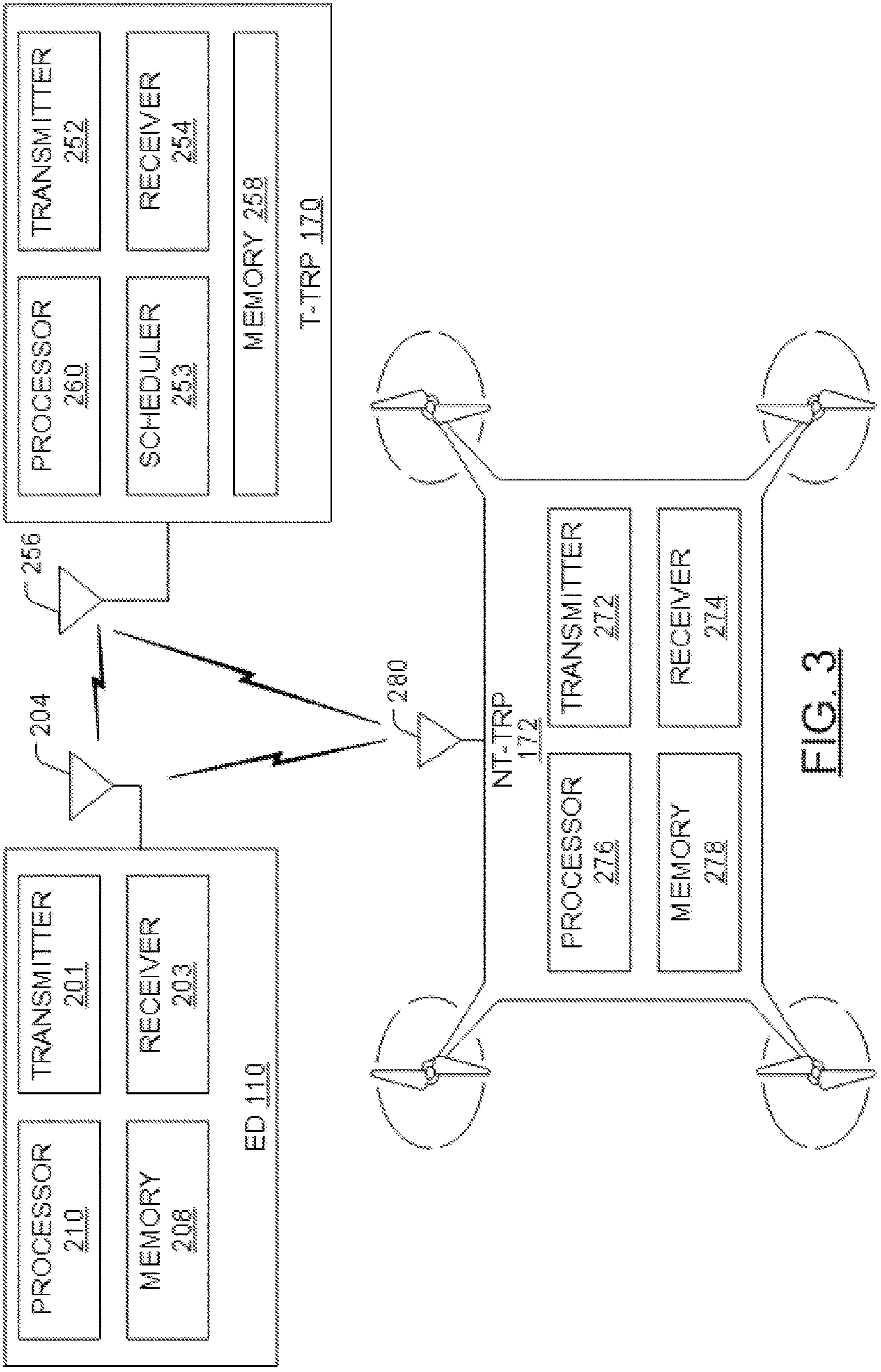
FIG. 3 illustrates, as a block diagram, elements of an example electronic device of FIG. 2, elements of an example terrestrial transmit receive point of FIG. 2 and elements of an example non-terrestrial transmit receive point of FIG. 2, in accordance with aspects of the present application.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g., communication module, modem, or chip) in the forgoing devices, among other possibilities. Future generation EDs 110 may be referred to using other terms. The base stations 170*a* and 170*b* each T-TRPs and will, hereafter, be referred to as T-TRP 170. Also shown in FIG. 3, a NT-TRP will hereafter be referred to as NT-TRP 172. Each ED 110 connected to the T-TRP 170 and/or the NT-TRP 172 can be dynamically or semi-statically turned-on (i.e., established, activated or enabled), turned-off (i.e., released, deactivated or disabled) and/or configured in response to one of more of: connection availability; and connection necessity.

The ED 110 includes a transmitter 201 and a receiver 203 coupled to one or more antennas 204. Only one antenna 204 is illustrated. One, some, or all of the antennas 204 may, alternatively, be panels. The transmitter 201 and the receiver 203 may be integrated, e.g., as a transceiver. The transceiver is configured to modulate data or other content for transmission by the at least one antenna 204 or by a network interface controller (NIC). The transceiver may also be configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by one or more processing unit(s) (e.g., a processor 210). Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache and the like.

The ED 110 may further include one or more input/output devices (not shown) or interfaces (such as a wired interface to the Internet 150 in FIG. 1). The input/output devices permit interaction with a user or other devices in the network. Each input/output device includes any suitable structure for providing information to, or receiving information from, a user, such as through operation as a speaker, a microphone, a keypad, a keyboard, a display or a touch screen, including network interface communications.

The ED 110 includes the processor 210 for performing operations including those operations related to preparing a transmission for uplink transmission to the NT-TRP 172 and/or the T-TRP 170, those operations related to processing downlink transmissions received from the NT-TRP 172 and/or the T-TRP 170, and those operations related to processing sidelink transmission to and from another ED 110. Processing operations related to preparing a transmission for uplink transmission may include operations such as encoding, modulating, transmit beamforming and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by the NT-TRP 172 and/or by the T-TRP 170. In some embodiments, the processor 210 implements the transmit beamforming and/or the receive beamforming based on the indication of beam direction, e.g., beam angle information (BAI), received from the T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or from the T-TRP 170.

Although not illustrated, the processor 210 may form part of the transmitter 201 and/or part of the receiver 203. Although not illustrated, the memory 208 may form part of the processor 210.

The processor 210, the processing components of the transmitter 201 and the processing components of the receiver 203 may each be implemented by the same or different one or more processors that are configured to execute instructions stored in a memory (e.g., the in memory 208). Alternatively, some or all of the processor 210, the processing components of the transmitter 201 and the processing components of the receiver 203 may each be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a remote radio head, a terrestrial node, a terrestrial network device, a terrestrial base station, a base band unit (BBU), a remote radio unit (RRU), an active antenna unit (AAU), a remote radio head (RRH), a central unit (CU), a distribute unit (DU), a positioning node, among other possibilities. The T-TRP 170 may be a macro BS, a pico BS, a relay node, a donor node, or the like, or combinations thereof. The T-TRP 170 may refer to the forgoing devices or refer to apparatus (e.g., a communication module, a modem or a chip) in the forgoing devices.

In some embodiments, the parts of the T-TRP 170 may be distributed. For example, some of the modules of the T-TRP 170 may be located remote from the equipment that houses antennas 256 for the T-TRP 170, and may be coupled to the equipment that houses antennas 256 over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment that houses antennas 256 of the T-TRP 170. The modules may also be coupled to other T-TRPs. In some embodiments, the T-TRP 170 may actually be a plurality of T-TRPs that are operating together to serve the ED 110, e.g., through the use of coordinated multipoint transmissions.

As illustrated in FIG. 3, the T-TRP 170 includes at least one transmitter 252 and at least one receiver 254 coupled to one or more antennas 256. Only one antenna 256 is illustrated. One, some, or all of the antennas 256 may, alternatively, be panels. The transmitter 252 and the receiver 254 may be integrated as a transceiver. The T-TRP 170 further includes a processor 260 for performing operations including those related to: preparing a transmission for downlink transmission to the ED 110; processing an uplink transmission received from the ED 110; preparing a transmission for backhaul transmission to the NT-TRP 172; and processing a transmission received over backhaul from the NT-TRP 172. Processing operations related to preparing a transmission for downlink or backhaul transmission may include operations such as encoding, modulating, precoding (e.g., multiple input multiple output, "MIMO," precoding), transmit beamforming and generating symbols for transmission. Processing operations related to processing received transmissions in the uplink or over backhaul may include operations such as receive beamforming, demodulating received symbols and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates an indication of beam direction, e.g., BAI, which may be scheduled for transmission by a scheduler 253. The processor 260 performs other network-side processing operations described herein, such as determining the location of the ED 110, determining where to deploy the NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that "signaling," as used herein, may alternatively be called control signaling. Dynamic signaling may be transmitted in a control channel, e.g., a physical downlink control channel (PDCCH) and static, or semi-static, higher layer signaling may be included in a packet transmitted in a data channel, e.g., in a physical downlink shared channel (PDSCH).

The scheduler 253 may be coupled to the processor 260. The scheduler 253 may be included within, or operated separately from, the T-TRP 170. The scheduler 253 may schedule uplink, downlink and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or part of the receiver 254. Also, although not illustrated, the processor 260 may implement the scheduler 253. Although not illustrated, the memory 258 may form part of the processor 260.

The processor 260, the scheduler 253, the processing components of the transmitter 252 and the processing components of the receiver 254 may each be implemented by the same, or different one of, one or more processors that are configured to execute instructions stored in a memory, e.g., in the memory 258. Alternatively, some or all of the processor 260, the scheduler 253, the processing components of the transmitter 252 and the processing components of the receiver 254 may be implemented using dedicated circuitry, such as a FPGA, a GPU or an ASIC.

Notably, the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110; processing an uplink transmission received from the ED 110; preparing a transmission for backhaul transmission to T-TRP 170; and processing a transmission received over backhaul from the T-TRP 170. Processing operations related to preparing a transmission for downlink or backhaul transmission may include operations such as encoding, modulating, precoding (e.g., MIMO precoding), transmit beamforming and generating symbols for transmission. Processing operations related to processing received transmissions in the uplink or over backhaul may include operations such as receive beamforming, demodulating received signals and decoding received symbols. In some embodiments, the processor 276 implements the transmit beamforming and/or receive beamforming based on beam direction information (e.g., BAI) received from the T-TRP 170. In some embodiments, the processor 276 may generate signaling, e.g., to configure one or more parameters of the ED 110. In some embodiments, the NT-TRP 172 implements physical layer processing but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or part of the receiver 274. Although not illustrated, the memory 278 may form part of the processor 276.

The processor 276, the processing components of the transmitter 272 and the processing components of the receiver 274 may each be implemented by the same or different one or more processors that are configured to execute instructions stored in a memory, e.g., in the memory 278. Alternatively, some or all of the processor 276, the processing components of the transmitter 272 and the processing components of the receiver 274 may be implemented using dedicated circuitry, such as a programmed FPGA, a GPU or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

Figure 4:
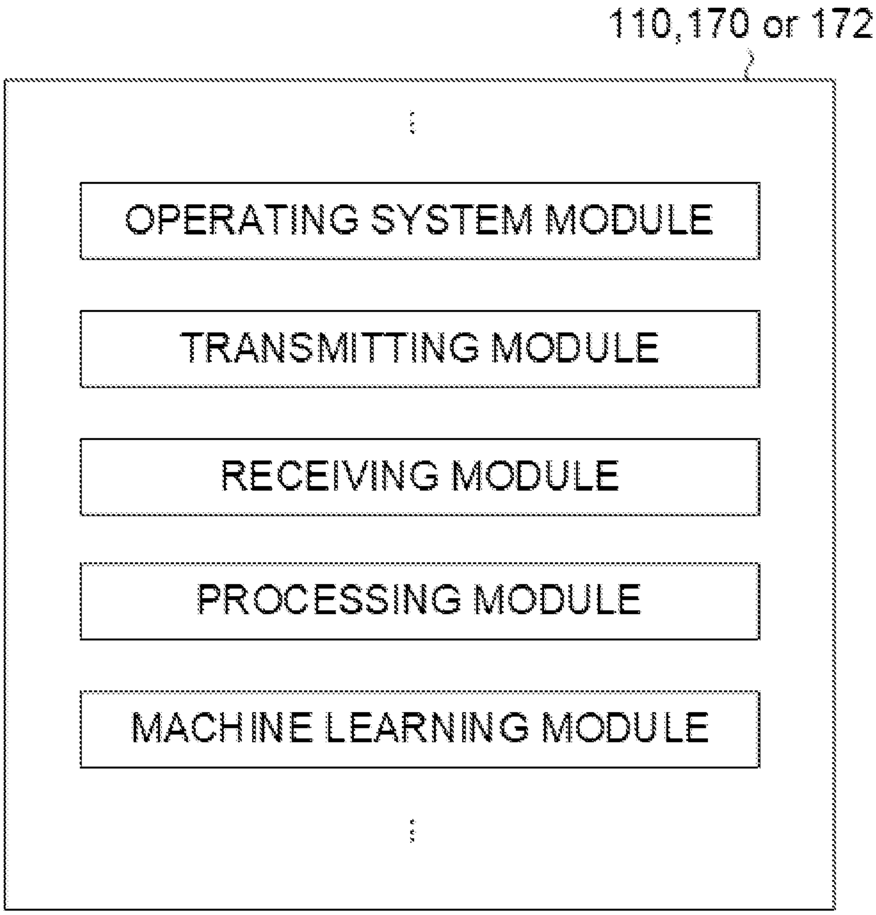
FIG. 4 illustrates, as a block diagram, various modules that may be included in an example electronic device, an example terrestrial transmit receive point and an example non-terrestrial transmit receive point, in accordance with aspects of the present application.

One or more steps of the embodiment methods provided herein may be performed by corresponding units or modules, according to FIG. 4. FIG. 4 illustrates units or modules in a device, such as in the ED 110, in the T-TRP 170 or in the NT-TRP 172. For example, a signal may be transmitted by a transmitting unit or by a transmitting module. A signal may be received by a receiving unit or by a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU or an ASIC. It will be appreciated that where the modules are implemented using software for execution by a processor, for example, the modules may be retrieved by a processor, in whole or part as needed, individually or together for processing, in single or multiple instances, and that the modules themselves may include instructions for further deployment and instantiation.

Additional details regarding the EDs 110, the T-TRP 170 and the NT-TRP 172 are known to those of skill in the art. As such, these details are omitted here.

User Equipment (UE) position information is often used in cellular communication networks to improve various performance metrics for the network. Such performance metrics may, for example, include capacity, agility and efficiency. The improvement may be achieved when elements of the network exploit the position, the behavior, the mobility pattern (including a velocity vector containing a speed and a direction of the movement), etc., of the UE in the context of a priori information describing a wireless environment in which the UE is operating.

A sensing system may be used to help gather UE pose information and information about the wireless environment. UE pose information may include UE location in a global coordinate system, UE velocity and direction of movement in the global coordinate system (e.g., a UE velocity vector) and UE orientation information. “Location” is also known as “position” and these two terms may be used interchangeably herein. Examples of well-known sensing systems include RADAR (Radio Detection and Ranging) and LIDAR (Light Detection and Ranging). While the sensing system can be separate from the communication system, it could be advantageous to gather the information using an integrated system, which reduces the hardware (and cost) in the system as well as the time, frequency or spatial resources needed to perform both functionalities. However, using the communication system hardware to perform sensing of UE pose and environment information is a highly challenging and open problem. The difficulty of the problem relates to factors such as the limited resolution of the communication system, the dynamicity of the environment, and the huge number of objects whose electromagnetic properties and position are to be estimated.

Accordingly, integrated sensing and communication (also known as integrated communication and sensing) is a desirable feature in existing and future communication systems.

Any or all of the EDs 110 and BS 170 may be sensing nodes in the system 100. Sensing nodes are network entities that perform sensing by transmitting and receiving sensing signals. Some sensing nodes are communication equipment that perform both communications and sensing. However, it is possible that some sensing nodes do not perform communications and are, instead, dedicated to sensing. The sensing agent 174 is an example of a sensing node that is dedicated to sensing. Unlike the EDs 110 and BS 170, the sensing agent 174 does not transmit or receive communication signals. However, the sensing agent 174 may communicate configuration information, sensing information, signaling information, or other information within the communication system 100. The sensing agent 174 may be in communication with the core network 130 to communicate information with the rest of the communication system 100. By way of example, the sensing agent 174 may determine the location of the ED 110*a*, and transmit this information to the base station 170*a* via the core network 130. Although only one sensing agent 174 is shown in FIG. 2, any number of sensing agents may be implemented in the communication system 100. In some embodiments, one or more sensing agents may be implemented at one or more of the RANs 120.

A sensing node may combine sensing-based techniques with reference signal-based techniques to enhance UE pose determination. This type of sensing node may also be known as a sensing management function (SMF). In some networks, the SMF may also be known as a location management function (LMF). The SMF may be implemented as a physically independent entity located at the core network 130 with connection to the multiple BSs 170. In other aspects of the present application, the SMF may be implemented as a logical entity co-located inside a BS 170 through logic carried out by the processor 260.

Figure 5:
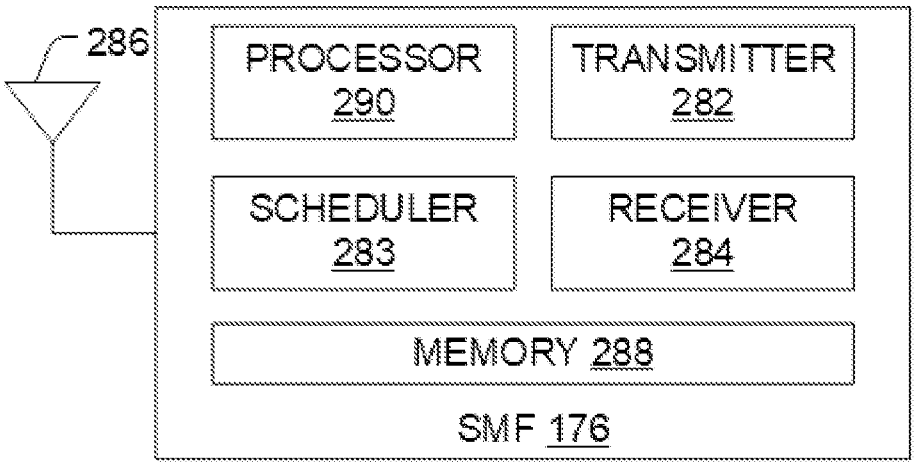
FIG. 5 illustrates, as a block diagram, a sensing management function, in accordance with aspects of the present application.

As shown in FIG. 5, an SMF 176, when implemented as a physically independent entity, includes at least one processor 290, at least one transmitter 282, at least one receiver 284, one or more antennas 286 and at least one memory 288. A transceiver, not shown, may be used instead of the transmitter 282 and the receiver 284. A scheduler 283 may be coupled to the processor 290. The scheduler 283 may be included within or operated separately from the SMF 176. The processor 290 implements various processing operations of the SMF 176, such as signal coding, data processing, power control, input/output processing or any other functionality. The processor 290 can also be configured to implement some or all of the functionality and/or embodiments described in more detail above. Each processor 290 includes any suitable processing or computing device configured to perform one or more operations. Each processor 290 could, for example, include a microprocessor, microcontroller, digital signal processor, field programmable gate array or application specific integrated circuit.

A reference signal-based pose determination technique belongs to an "active" pose estimation paradigm. In an active pose estimation paradigm, the enquirer of pose information (e.g., the UE 110) takes part in process of determining the pose of the enquirer. The enquirer may transmit or receive (or both) a signal specific to pose determination process. Positioning techniques based on a global navigation satellite system (GNSS) such as the known Global Positioning System (GPS) are other examples of the active pose estimation paradigm.

In contrast, a sensing technique, based on radar for example, may be considered as belonging to a "passive" pose determination paradigm. In a passive pose determination paradigm, the target is oblivious to the pose determination process.

By integrating sensing and communications in one system, the system need not operate according to only a single paradigm. Thus, the combination of sensing-based techniques and reference signal-based techniques can yield enhanced pose determination.

The enhanced pose determination may, for example, include obtaining UE channel subspace information, which is particularly useful for UE channel reconstruction at the sensing node, especially for a beam-based operation and communication. The UE channel subspace is a subset of the entire algebraic space, defined over the spatial domain, in which the entire channel from the TP to the UE lies. Accordingly, the UE channel subspace defines the TP-to-UE channel with very high accuracy. The signals transmitted over other subspaces result in a negligible contribution to the UE channel. Knowledge of the UE channel subspace helps to reduce the effort needed for channel measurement at the UE and channel reconstruction at the network-side. Therefore, the combination of sensing-based techniques and reference signal-based techniques may enable the UE channel reconstruction with much less overhead as compared to traditional methods. Subspace information can also facilitate subspace-based sensing to reduce sensing complexity and improve sensing accuracy.

In some embodiments of integrated sensing and communication, a same radio access technology (RAT) is used for sensing and communication. This avoids the need to multiplex two different RATs under one carrier spectrum, or necessitating two different carrier spectrums for the two different RATs.

In embodiments that integrate sensing and communication under one RAT, a first set of channels may be used to transmit a sensing signal and a second set of channels may be used to transmit a communications signal. In some embodiments, each channel in the first set of channels and each channel in the second set of channels is a logical channel, a transport channel or a physical channel.

At the physical layer, communication and sensing may be performed via separate physical channels. For example, a first physical downlink shared channel PDSCH-C is defined for data communication, while a second physical downlink shared channel PDSCH-S is defined for sensing. Similarly, separate physical uplink shared channels (PUSCH), PUSCH-C and PUSCH-S, could be defined for uplink communication and sensing.

In another example, the same PDSCH and PUSCH could be also used for both communication and sensing, with separate logical layer channels and/or transport layer channels defined for communication and sensing. Note also that control channel(s) and data channel(s) for sensing can have the same or different channel structure (format), occupy same or different frequency bands or bandwidth parts.

In a further example, a common physical downlink control channel (PDCCH) and a common physical uplink control channel (PUCCH) may be used to carry control information for both sensing and communication. Alternatively, separate physical layer control channels may be used to carry separate control information for communication and sensing. For example, PUCCH-S and PUCCH-C could be used for uplink control for sensing and communication respectively and PDCCH-S and PDCCH-C for downlink control for sensing and communication respectively.

Different combinations of shared and dedicated channels for sensing and communication, at each of the physical, transport, and logical layers, are possible.

The term RADAR originates from the phrase Radio Detection and Ranging; however, expressions with different forms of capitalization (e.g., Radar and radar) are equally valid and now more common. Radar is typically used for detecting a presence and a location of an object. A radar system radiates radio frequency energy and receives echoes of the energy reflected from one or more targets. The system determines the pose of a given target based on the echoes returned from the given target. The radiated energy can be in the form of an energy pulse or a continuous wave, which can be expressed or defined by a particular waveform.

Examples of waveforms used in radar include frequency modulated continuous wave (FMCW) and ultra-wideband (UWB) waveforms.

Radar systems can be monostatic, bi-static or multi-static. In a monostatic radar system, the radar signal transmitter and receiver are co-located, such as being integrated in a transceiver. In a bi-static radar system, the transmitter and receiver are spatially separated, and the distance of separation is comparable to, or larger than, the expected target distance (often referred to as the range). In a multi-static radar system, two or more radar components are physically separate but with a shared area of coverage. A multi-static radar is also referred to as a multisite or netted radar.

Terrestrial radar applications encounter challenges such as multipath propagation and shadowing impairments. Another challenge is the problem of identifiability because terrestrial targets have similar physical attributes. Integrating sensing into a communication system is likely to suffer from these same challenges, and more.

Communication nodes can be either half-duplex or full-duplex. A half-duplex node cannot both transmit and receive using the same physical resources (time, frequency, etc.); conversely, a full-duplex node can transmit and receive using the same physical resources. Existing commercial wireless communications networks are all half-duplex. Even if full-duplex communications networks become practical in the future, it is expected that at least some of the nodes in the network will still be half-duplex nodes because half-duplex devices are less complex, and have lower cost and lower power consumption. In particular, full-duplex implementation is more challenging at higher frequencies (e.g., in millimeter wave bands) and very challenging for small and low-cost devices, such as femtocell base stations and UEs.

The limitation of half-duplex nodes in the communications network presents further challenges toward integrating sensing and communications into the devices and systems of the communications network. For example, both half-duplex and full-duplex nodes can perform bi-static or multi-static sensing, but monostatic sensing typically requires the sensing node have full-duplex capability. A half-duplex node may perform monostatic sensing with certain limitations, such as in a pulsed radar with a specific duty cycle and ranging capability.

Properties of a sensing signal, or a signal used for both sensing and communication, include the waveform of the signal and the frame structure of the signal. The frame structure defines the time domain boundaries of the signal. The waveform describes the shape of the signal as a function of time and frequency. Examples of waveforms that can be used for a sensing signal include ultra-wide band (UWB) pulse, Frequency-Modulated Continuous Wave (FMCW) or "chirp", orthogonal frequency-division multiplexing (OFDM), cyclic prefix (CP)-OFDM, and Discrete Fourier Transform spread (DFT-s)-OFDM.

In an embodiment, the sensing signal is a linear chirp signal with bandwidth B and time duration T. Such a linear chirp signal is generally known from its use in FMCW radar systems. A linear chirp signal is defined by an increase in frequency from an initial frequency, $f_{chirp0}$, at an initial time, $t_{chirp0}$, to a final frequency, $f_{chirp1}$, at a final time, $t_{chirp1}$ where the relation between the frequency (f) and time (t) can be expressed as a linear relation of $f-f_{chirp0}=\alpha(t-t_{chirp0})$, where $$\alpha = \frac{f_{chirp1} - f_{chirp0}}{t_{chirp1} - t_{chirp0}}$$

is defined as the chirp slope. The bandwidth of the linear chirp signal may be defined as $B=f_{chirp1}-f_{chirp0}$ and the time duration of the linear chirp signal may be defined as $T=t_{chirp1}-t_{chirp0}$. Such linear chirp signal can be presented as $e^{j\pi\alpha t^2}$ in the baseband representation.

MIMO technology allows an antenna array of multiple antennas to perform signal transmissions and receptions to meet high transmission rate requirements. The ED 110 and the T-TRP 170 and/or the NT-TRP may use MIMO to communicate using wireless resource blocks. MIMO utilizes multiple antennas at the transmitter to transmit wireless resource blocks over parallel wireless signals. It follows that multiple antennas may be utilized at the receiver. MIMO may beamform parallel wireless signals for reliable multipath transmission of a wireless resource block. MIMO may bond parallel wireless signals that transport different data to increase the data rate of the wireless resource block.

In recent years, a MIMO (large-scale MIMO) wireless communication system with the T-TRP 170 and/or the NT-TRP 172 configured with a large number of antennas has gained wide attention from academia and industry. In the large-scale MIMO system, the T-TRP 170, and/or the NT-TRP 172, is generally configured with more than ten antenna units (see antennas 256 and antennas 280 in FIG. 3). The T-TRP 170, and/or the NT-TRP 172, is generally operable to serve dozens (such as 40) of EDs 110. A large number of antenna units of the T-TRP 170 and the NT-TRP 172 can greatly increase the degree of spatial freedom of wireless communication, greatly improve the transmission rate, spectrum efficiency and power efficiency, and, to a large extent, reduce interference between cells. The increase of the number of antennas allows for each antenna unit to be made in a smaller size with a lower cost. Using the degree of spatial freedom provided by the large-scale antenna units, the T-TRP 170 and the NT-TRP 172 of each cell can communicate with many EDs 110 in the cell on the same time-frequency resource at the same time, thus greatly increasing the spectrum efficiency. A large number of antenna units of the T-TRP 170 and/or the NT-TRP 172 also enable each user to have better spatial directivity for uplink and downlink transmission, so that the transmitting power of the T-TRP 170 and/or the NT-TRP 172 and an ED 110 is reduced and the power efficiency is correspondingly increased. When the antenna number of the T-TRP 170 and/or the NT-TRP 172 is sufficiently large, random channels between each ED 110 and the T-TRP 170 and/or the NT-TRP 172 can approach orthogonality such that interference between cells and users and the effect of noise can be reduced. The plurality of advantages described hereinbefore enable large-scale MIMO to have a magnificent application prospect.

A MIMO system may include a receiver connected to a receive (Rx) antenna, a transmitter connected to transmit (Tx) antenna and a signal processor connected to the transmitter and the receiver. Each of the Rx antenna and the Tx antenna may include a plurality of antennas. For instance, the Rx antenna may have a uniform linear array (ULA) antenna, in which the plurality of antennas are arranged in line at even intervals. When a radio frequency (RF) signal is transmitted through the Tx antenna, the Rx antenna may receive a signal reflected and returned from a forward target.

A non-exhaustive list of possible unit or possible configurable parameters or in some embodiments of a MIMO system include: a panel; and a beam.

A panel is a unit of an antenna group, or antenna array, or antenna sub-array, which unit can control a Tx beam or a Rx beam independently.

A beam may be formed by performing amplitude and/or phase weighting on data transmitted or received by at least one antenna port. A beam may be formed by using another method, for example, adjusting a related parameter of an antenna unit. The beam may include a Tx beam and/or a Rx beam. The transmit beam indicates distribution of signal strength formed in different directions in space after a signal is transmitted through an antenna. The receive beam indicates distribution of signal strength that is of a wireless signal received from an antenna and that is in different directions in space. Beam information may include a beam identifier, or an antenna port(s) identifier, or a channel state information reference signal (CSI-RS) resource identifier, or a SSB resource identifier, or a sounding reference signal (SRS) resource identifier, or other reference signal resource identifier.

Known high-resolution environment sensing and user sensing enable provision of many services and collection of information. The information that may be collected includes UE orientation, UE velocity vector and UE channel subspace. From some perspectives, the most important sensing information that may be collected may be categorized as high-accuracy positioning and localization and precise orientation estimation.

In current communication systems, services related to localization and positioning are optional. These services may be made available either through an evolution of known positioning techniques or through NR-specific positioning techniques. The known positioning techniques include new radio enhanced cell ID (NR E-CID), downlink time difference of arrival (DL-TODA) and uplink time difference of arrival (UL-TODA). The NR-specific positioning techniques include uplink angle of arrival (UL-AOA), downlink angle of departure (DL-AoD) and multi-cell round trip time (multi-cell RRT).

In all of these positioning techniques, multiple transmit/receive points (TRPs) or base stations 170 may be expected to cooperate, either by sending synchronized positioning reference signals or by receiving sounding reference signal, taking measurements and sending the measurements to the location management function (LMF). Relying on multiple TRPs 170 to provide location information about a given UE 110 has two main disadvantages. The first main disadvantage is a relatively high signaling overhead used for coordination and cooperation. The second main disadvantage relates to synchronization errors resulting from a mismatch of clock parameters at the multiple TRPs 170. These disadvantages may be seen to result in relatively large localization error. Such localization error may be considered to be intolerable in the context of new use cases for localization and positioning information.

Moreover, these positioning techniques may be shown to include, in localization calculations, an assumption of a line of sight (LOS) between TP and UE. The LOS assumption may be shown to cause calculations associated with these positioning techniques to be susceptible to relatively high errors due to a bias in those cases wherein the LOS is weak or does not exist. This bias may be called a non-LOS (NLOS) bias. Many methods have been developed for alleviating effects of these errors through NLOS identification and mitigation. However, either the methods rely on signaling exchange between network nodes or the methods are based on complicated algorithms, such as maximum likelihood (ML) algorithms, least squares (LS) algorithms and constrained optimization algorithms.

Other research directions are related to attempting to alleviate the synchronization errors associated with using multiple TRPs. Different positioning techniques have been proposed that are based on utilizing the multipath components resulting from specular signal reflections of a transmitted signal from surrounding walls and objects. Thus, a single TRP surrounded by many reflectors may act as a group of synchronized TRPs. The surrounding walls and objects, with known locations, may be shown to create virtual TRPs by mirroring the actual TRP location around their respective planes of reflection.

However, these positioning techniques may be shown to suffer from a multipath-reflectors association problem, causing severe degradation to the accuracy of the estimated position. This multipath-reflectors association problem results from the uncertainty of associating each received multipath component to its relevant reflector. All these factors and problems impact the accuracy of obtaining position information (also known as location information). Consequently, these techniques may be shown to have a very low accuracy, in the order of ten meters. In contrast, most of the future use cases for position information work better with a position accuracy at the centimeter level.

In overview, aspects of the present application relate to sensing an environment and devices in the environment. Conveniently, aspects of the present application may be shown to tackle problems, such as NLOS-bias and synchronization errors, of known sensing techniques. Aspects of the present application relate to obtaining relatively high-resolution location information about a UE 110 and, concurrently, sensing the environment. Additional aspects of the present application relate to obtaining other information about the UE 110, such as UE orientation, UE velocity vector and UE channel subspace.

Aspects of the present application relate to utilizing relatively high-resolution capabilities of massive MIMO and mmWave technologies in the spatial domain, the angular domain, and the time domain. By utilizing these capabilities, the resolvability of the multipath components may be increased. Accordingly, the environment may be sensed while, concurrently, localizing the UE 110 with relatively high resolution and accuracy. In contrast to current sensing and positioning techniques, aspects of the present application may achieve these benefits in a single TRP 170 to concurrently sense the environment and provide information about UEs 110. Moreover, aspects of the present application exploit multipath components (including NLOS) to enhance the accuracy of the UE position information, the UE velocity information and the UE orientation information. Aspects of the present application may be shown to provide an association between observations and path indices thanks to a specific sensing signal design, a measurement and signaling mechanism that corresponds to the specific sensing signal design, or a combination thereof.

Figure 6:
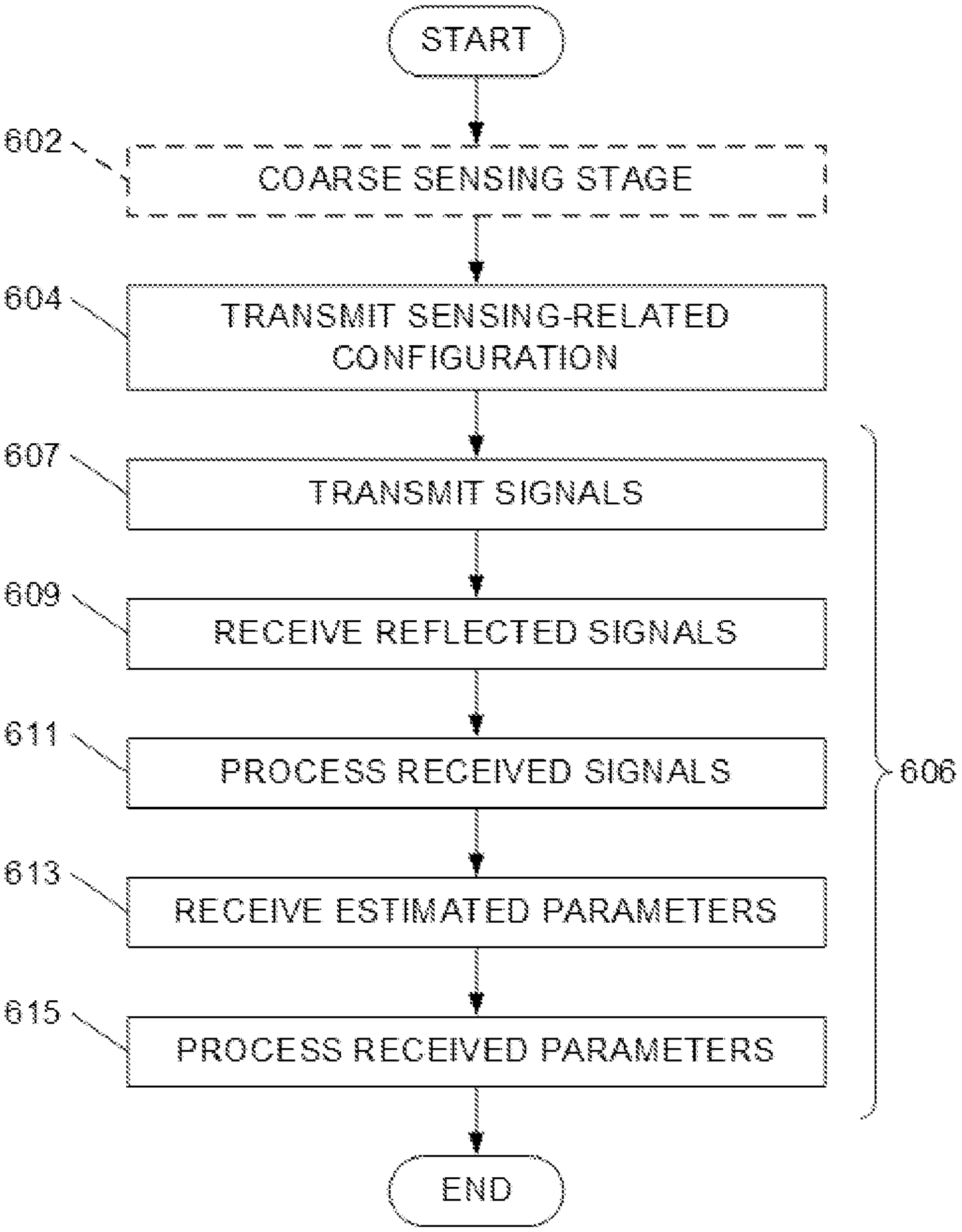
FIG. 6 illustrates example steps in a method of sensing according to aspects of the present application.

FIG. 6 illustrates example steps in a method of sensing according to aspects of the present application. Aspects of the present application relate to operating in two stages. In an optional primary stage (step 602), which may be referenced as a "coarse sensing" stage, the environment is sensed. In some embodiments, some information about the UEs 110 (e.g., UE existence and approximate UE location) can be obtained during "coarse sensing" (step 602). Notably, a communication signal, transmitted by the TRP 170, may be reused in the coarse sensing stage. In the primary stage (step 602) the TRP 170 may obtain an RF map of an environment, the environment including at least one UE 110 and at least one reflector. The RF map may be obtained by various means, such as the optional sensing procedure in the primary stage (step 602). Alternatively, the RF map may be previously created and stored in a memory, in which case obtaining the RF map comprises retrieving the RF map from the memory Additionally, the TRP 170 may define, based on the RF map, a subspace for sensing the UE 110. Furthermore, the TRP 170 may develop a configuration for sensing reference signals for sensing the UE 110, the configuration may associate a distinct sensing signal with each reflector. The TRP 170 may then transmit (step 604) the sensing-related configuration to the UE 110.

In a secondary stage (step 606), which may be referenced as a "fine sensing" stage, the configured sensing signals are used to sense the UE 110, the reflectors and the environment. In particular, in the secondary stage (step 606), the TRP 170 transmits (step 607) signals. The signals may be typical communication signals or may be specifically designed reference signals, which will be discussed hereinafter. Subsequently, the TRP 170 receives (step 609) and processes (step 611) reflections of the signals. Additionally, on the basis of receiving the signals, the UE 110 may estimate some parameters, in a manner discussed hereinafter. The UE 110 may then transmit, to the TRP 170, an indication of the estimated parameters. Accordingly, the TRP 170 may receive (step 613) and process (step 615) the estimated parameters.

The environment sensing in the secondary stage (step 606) allows for an update to be recorded for the RF map, such as the RF map sensed in the optional primary stage (step 602) for example. The secondary stage (step 606) allows the TRP 170 to obtain information about the UE 110. The TRP 170 may obtain the information about the UE 110 by processing (step 611) reflections received (step 609) from the UE 110 or by processing (step 615) information received (step 613) from the UE 110, where the UE 110 has determined the information. In accordance with some aspects of the present application, a very initial instance of an RF map of the environment may be available to the TRP 170 even before the coarse sensing stage (step 602). The very initial instance of the RF map may, for example, capture fixed objects (e.g., buildings and walls) in the environment, based on the location of the fixed objects, the material of the fixed objects and the location of the TRP 170.

Figure 7:
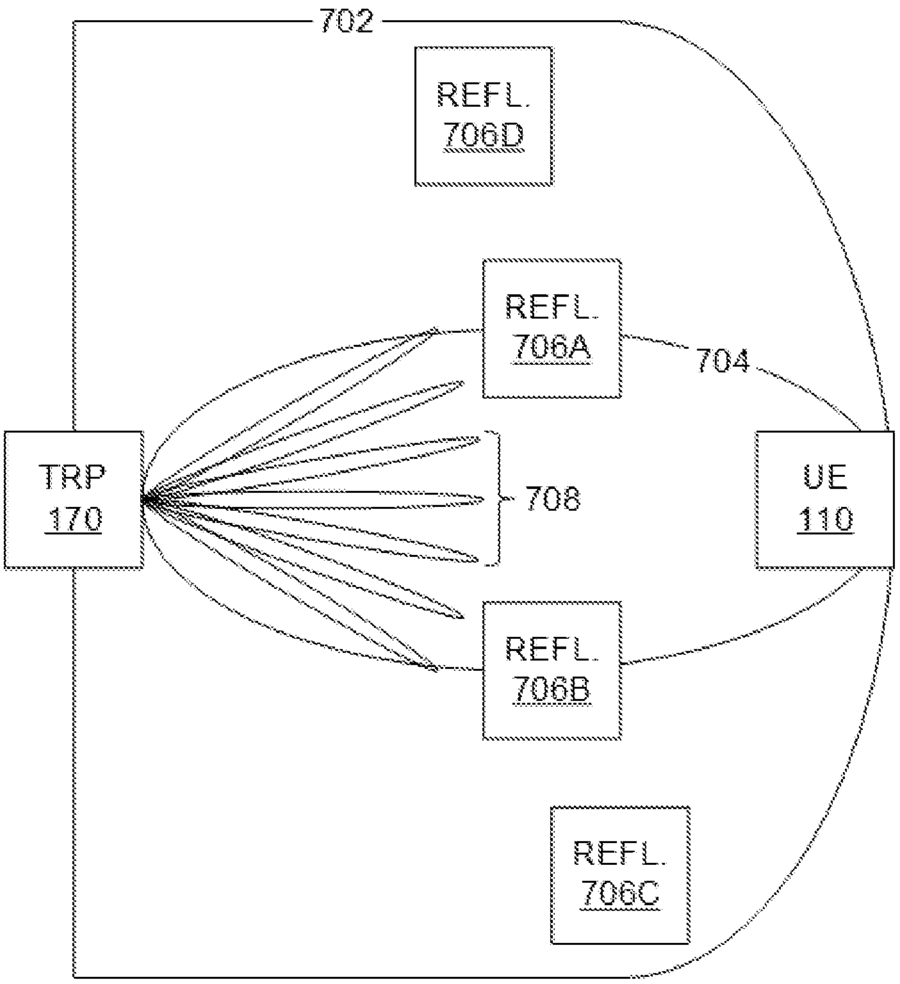
FIG. 7 illustrates a transmit receive point in an environment wherein sensing according to aspects of the present application may be carried out.

FIG. 7 illustrates a TRP 170 in an environment wherein sensing according to aspects of the present application may be carried out. In the primary stage (step 602), the TRP 170 may sense an entire communication space, identified, in FIG. 7, as bounded by a boundary line associated with reference numeral 702. The entire communication space 702 of FIG. 7 includes a UE 110 and a plurality of reflectors: a first reflector 706A; a second reflector 706B; a third reflector 706C; and a fourth reflector 706D (individually or collectively 706). When sensing the entire communication space 702 in the primary stage (step 602), the TRP 170 may use a relatively wide beam or a relatively small bandwidth. As a result of sensing the entire communication space 702, the TRP 170 may generate an RF map representative of the entire communication space 702. The RF map may include a coarse location and orientation for the UE 110 and the reflectors 706.

The primary stage (step 602) may be carried out, by the TRP 170 using one or more known sensing technologies, to give the TRP 170 coarse information about the orientation and location, in the communication space 702, of devices (e.g., the UE 110) and potential reflectors (e.g., the reflectors 706). Known sensing technologies include: new radio enhanced cell ID (NR E-CID); downlink time difference of arrival (DL-TODA); and uplink time difference of arrival (UL-TODA). Known sensing technologies include NR-specific positioning techniques such as: uplink angle of arrival (UL-AOA); downlink angle of departure (DL-AoD); and multi-cell round trip time (multi-cell RTT). In some embodiments, a sensing-based UE detection technique can be used to detect the presence of, and/or obtain an approximate location for, the UE 110 based on passive reflection by the UE. By determining potential reflectors' respective locations and orientations, the TRP 170 may define a plurality of virtual transmit points (VTPs) by mirroring the location of the TRP 170 around a plane of reflection of each potential reflector (accordingly, a VTP may also be known as a mirror TP or any other suitable name). Subsequently, different multipath components received at the UE 110 may, eventually, be associated to the VTP. Such an association may be shown to enable enhanced sensing procedures. The enhancement is disclosed in the following.

The primary stage (step 602), for environment sensing, may be seen to allow for a narrowing of a communication space and, accordingly, a corresponding decrease in the potential number of reflectors 706 interacting with a transmitted reference signal. By decreasing the potential number of reflectors, it may be shown that there is a corresponding increase in accuracy for the device sensing part of a secondary stage (step 606).

On the basis of the RF map, the TRP 170 may define a set of potential communication regions. For example, on the basis of the RF map generated for entire communication space 702 of FIG. 7, the TRP 170 may define at least a first communication region identified, in FIG. 7, as bounded by a boundary line associated with reference numeral 704. The defined first communication region 704 may be referenced as a subspace.

In the secondary stage (step 606), the TRP 170 carries out targeted sensing. The targeted sensing is based on the RF map, obtained for example in the primary stage (step 602). When carrying out the targeted sensing of the secondary stage (step 606), the TRP 170 may use narrower beams or a wider bandwidth relative to the sensing technologies used in the primary stage (step 602).

The TRP 170 may sense the subspace 704 to estimate VTP location information, with higher accuracy than was obtained when the VTP location was defined in the primary stage (step 602), to associate with a location for a particular device. In the secondary stage (step 606), the TRP 170 may sense the environment using a communication signal. Alternatively, in the secondary stage (step 606), the TRP 170 may sense the environment using a Sensing Reference Signal (SeRS), a design for which is proposed herein. Multiple SeRS are illustrated in FIG. 7, with three of the SeRS associated with reference numeral 708.

Figure 8:
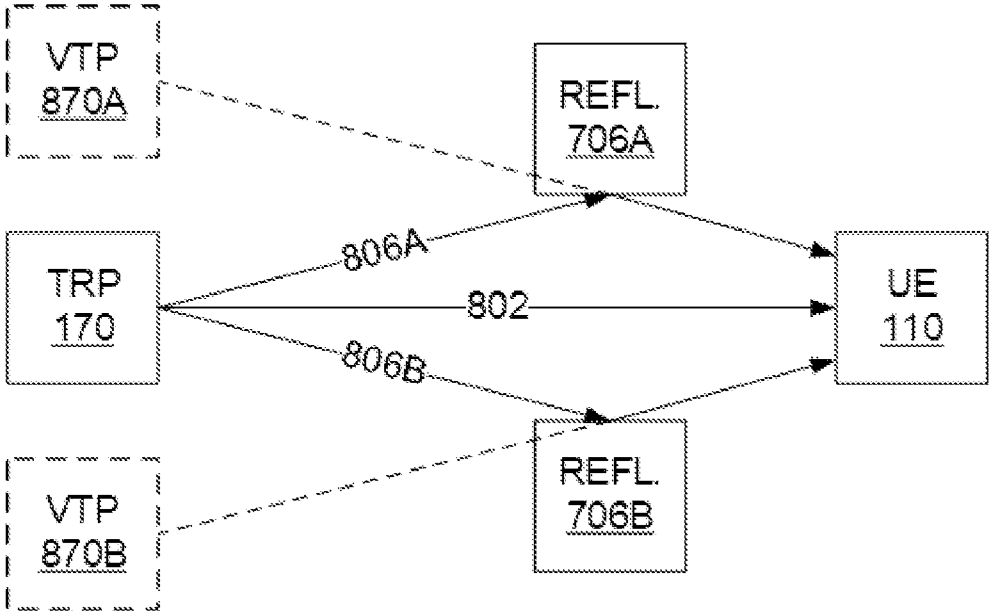
FIG. 8 illustrates elements of the environment of FIG. 7 to illustrate definition of virtual transmit points according to aspects of the present application.

FIG. 8 includes elements of the environment of FIG. 7 to illustrate examples of VTPs. It may be shown that a direct sensing signal 802 received, at the UE 110, directly from the TRP 170 is straightforward to interpret. In contrast, a first multipath sensing signal 806A is illustrated as reflecting off a first reflector 706A before arriving at the UE 110. Similarly, a second multipath sensing signal 806B is illustrated as reflecting off a second reflector 706B before arriving at the UE 110. The TRP 170, on the basis of processing the RF map obtained for example in the primary stage (step 602), may determine a coarse location for a first VTP 870A and a second VTP 870B. The TRP 170 may estimate a location for the first VTP 870A and the second VTP 870B, with the location only being associated with the location of the TRP 170. The location of each VTP 870 depends on the location of the TRP 170 and the location and orientation of the reflectors 706 in the environment. By changing the location of the UE 110, the subset of VTPs 870 visible to the UE 110 may change. The arrangement of FIG. 8, with the first VTP 870A corresponding to the first reflector 706A and the second VTP 870B corresponding to the second reflector 706B, relates to the UE position illustrated in FIG. 7. If the UE 110 is shifted to the top of FIG. 7, the UE 110 may only receive signals through reflection from the first reflector 706A and the fourth reflector 706D, which means that the corresponding visible VTPs 870 will be changed.

Sensing the environment using a communication signal is conventional and carries a disadvantage in that only the transmitter of the communication signal can process a reflected version of the communication signal because only the transmitter node maintains a record of the communication signal that has been transmitted.

In contrast, when a predetermined signal is transmitted by the TRP 170, all other nodes in the environment, including the UE 110, may process the original version of the predetermined signal and reflected versions of the predetermined signal. Such processing may be shown to allow any node that carries out the processing to obtain information from the processing. The SeRS, a design for which is disclosed herein, is proposed for use as the predetermined signal.

Figure 9:
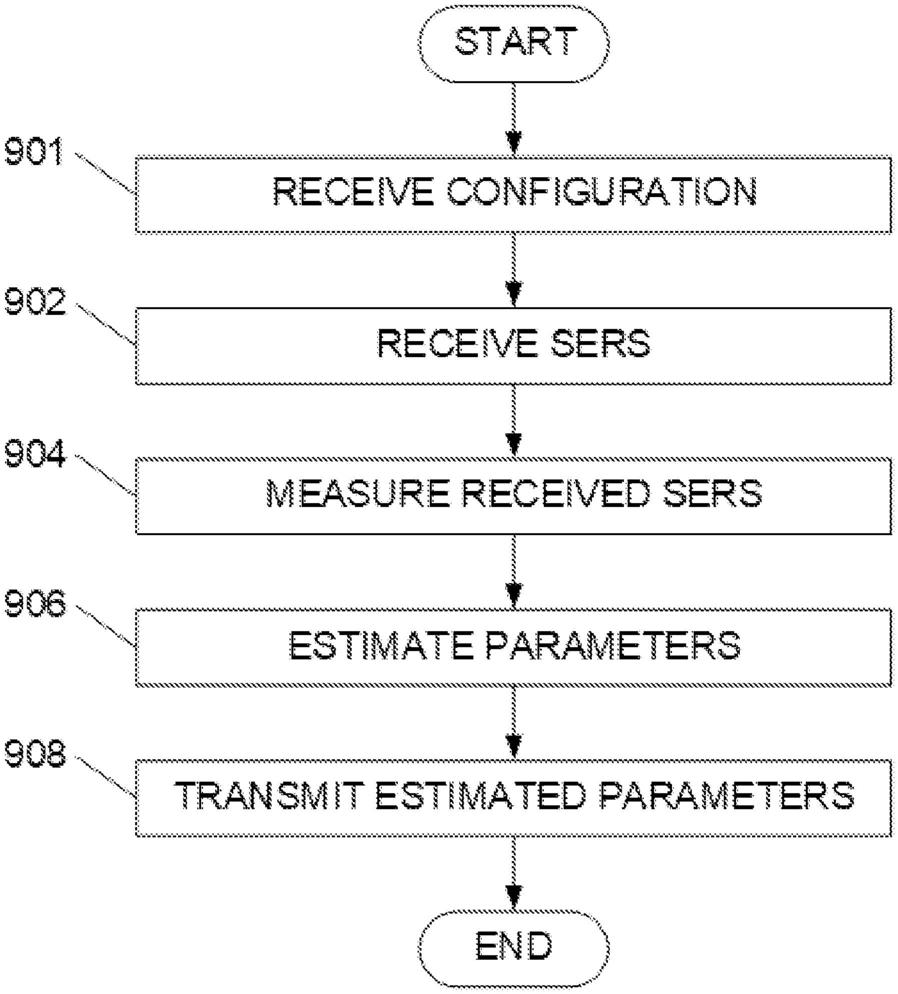
FIG. 9 illustrates example steps of a method of assisting sensing carried out at a user equipment according to aspects of the present application.

FIG. 9 illustrates example steps of a method of assisting sensing carried out at the UE 110. Subsequent to receiving (step 901) the sensing-related configuration communicated (step 604, FIG. 6) by the TRP 170, the UE 110 receives (step 902) the SeRS transmitted (step 607, FIG. 6) by the TRP 170. The UE 110 then carries out (step 904) measurements to estimate (step 906) a set of parameters for the received SeRS. The UE then transmits (step 908), to the TRP 170, an indication of the estimated parameters. The indication of the estimated parameters is subsequently received (step 613, FIG. 6) by the TRP 170.

Utilizing the SeRS may be shown to allow for environment sensing by carrying out (step 904) various other measurements at the UE 110 that go beyond straightforward device sensing. The various other measurements may include multipath identification measurements, range measurements, Doppler measurements, angular measurements, and orientation measurements. Subsequent to carrying out the measurements, the UE 110 may feedback (step 908) the measurements to the TRP 170.

The TRP 170 may perform association between measurements obtained at the TRP 170 and parameters received from the UE 110. On the basis of the association made at the TRP 170, the TRP 170 may obtain a position for the UE 110, a velocity vector for the UE 110 and an orientation of the UE 110 and channel subspace information for the UE 110.

Aspects of the present application relate to signaling for network-assisted UE sensing, in which the TRP 170 transmits UE-specific sensing set-up information to the UE 110. The UE-specific sensing set-up information may include SeRS configuration, indications of VTP locations and subspace direction or beam-association information.

Aspects of the present application relate to providing an association between a given signal (a given SeRS) and a certain reflector/VTP combination, within a sequence, of the given signal. The signal, $S_m(t)$, may be defined in a spatial domain and the sequence may be defined in a domain that is distinct from the spatial domain. The distinct domain may, for but a few examples, be a time domain, a frequency domain, or a code domain. The association between the SeRS and the sequence may be made possible by using M different beams, where each beam, among the M different beams, may be considered to have a potential to be associated to one reflector 706 and, eventually, associated to one VTP 870.

In an embodiment wherein the M different beams are multiplexed in a code domain, the SeRS may be based on a chirp signal. In this scenario, each reflector 706 or VTP 870 may be associated with a chirp signal, $S_m(t)$, with a different slope. The chirp signal may be implemented in the analog domain or implemented in the digital domain. Notably, implementation in the digital domain may be preferred, due to such an implementation being associated with more flexibility and more scalability when compared to implementation in the analog domain.

Figure 10:
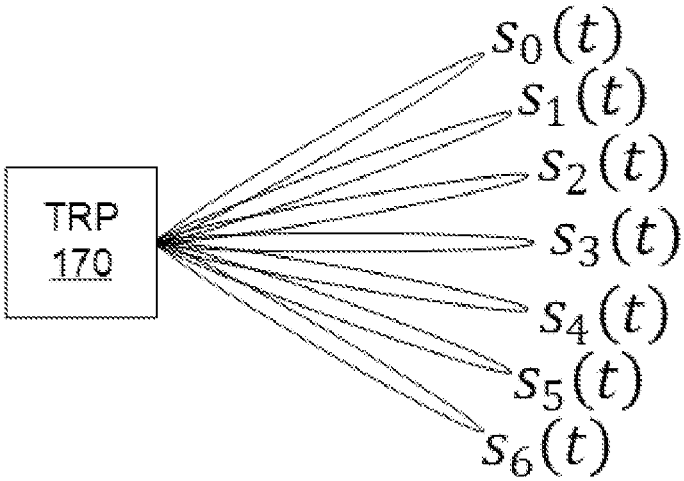
FIG. 10 illustrates a transmit receive point transmitting chirp signals multiplexed in a code domain, according to aspects of the present application.

An un-shifted chirp signal implemented in the analog domain may be represented as $s_m(t)=e^{j2\pi m\Delta ft+j\pi\alpha_m t^2}$, m=0, . . . , M−1, where $\alpha_m$ may be referred to as the chirp slope. FIG. 10 illustrates a TRP 170 transmitting chirp signals represented as $s_0(t)$, $s_1(t)$, $s_2(t)$, $s_3(t)$, $s_4(t)$, $s_5(t)$, and $s_6(t)$. FIG. 10 may be considered an illustration of transmitting SeRS wherein the M=7 different beams are multiplexed in a code domain.

Each VTP 870 and the TRP 170 may be configured to be associated with a different chirp slope, i.e., the $m^{th}$ VTP 870 may be configured to be associated with $\alpha_m$, thereby providing a SeRS design that allows for association between a given SeRS and a given transmit point (either the TRP 170 or a VTP 870). Notably, although the $m^{th}$ VTP 870 is discussed as being configured to use $\alpha_m$, in fact, the TRP 170 is configured to transmit a SeRS in a direction associated with the $m^{th}$ VTP 870, and it is that SeRS that uses the chirp slope $\alpha_m$.

In view of FIG. 8, M=3 and m=0, 1, 2. The TRP 170 may transmit the direct SeRS 802 with a chirp slope of $\alpha_0$. The TRP 170 may transmit the first multi-path SeRS 806A (associated, at the UE 110, with the first VTP 870A) with a chirp slope of $\alpha_1$. The TRP 170 may transmit the second multi-path SeRS 806B (associated, at the UE 110, with the second VTP 870B) with a chirp slope of $\alpha_2$. In aspects of the present application, the chirp slope, α, is the same for all beams. In such a case, chirps may be distinguished on the basis of mΔf (see the representation of the un-shifted chirp signal implemented in the analog domain, hereinbefore). That is, the SeRS sequences may have the same root, $\pi\alpha_m t^2$, but with different cyclic shifts, 2πmΔf. For the purposes of the present application, the term m=0 is associated with a line-of-sight (LOS) beam from the TRP 170 to the UE 110. Notably, during the sensing stages represented in FIG. 6, the UE 110 receives signals without awareness of which beam is an LOS beam from the TRP 170. Furthermore, the TRP 170 transmits beams in different directions without awareness of which beam direction corresponds to an LOS beam to the UE 110.

In another embodiment wherein the M different beams are multiplexed in a code domain and the SeRS is implemented in the digital domain, digital samples of the chirp signals may be designed to correspond to the known Zadoff-Chu sequences, with different cyclic shifts. In particular, the SeRS signal that is to be associated, at the UE 110, with the $m^{th}$ VTP 870 may be configured to correspond to the $$r_m^{th}$$

root Zadoff-Chu sequence and all cyclic shifts of the $r_m^{th}$ root Zadoff-Chu sequence. Such an approach may be shown to provide dedicated sensing to a given VTP 870. This dedicated sensing property may be understood to be due to a property of Zadoff-Chu sequences whereby each cyclically shifted version of a given Zadoff-Chu sequence is orthogonal to the given Zadoff-Chu sequence and to one another. The property may be shown to apply for those conditions wherein each cyclic shift is greater than a combined propagation delay and multipath delay spread. As a terminology note, a set of SeRS sequences associated to each VTP 870 may be referenced, herein, as a SeRS set and one of the VTPs 870 may be the TRP 170. In common with the SeRS sequences implemented in the analog domain, all SeRS sequences implemented in the digital domain may have the same root but with different cyclic shifts.

Figure 11:
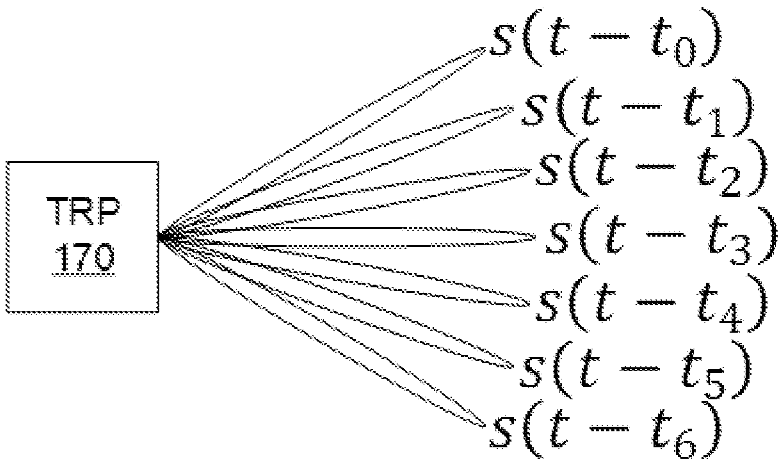
FIG. 11 illustrates a transmit receive point transmitting chirp signals multiplexed in a time domain, according to aspects of the present application.
Figure 12:
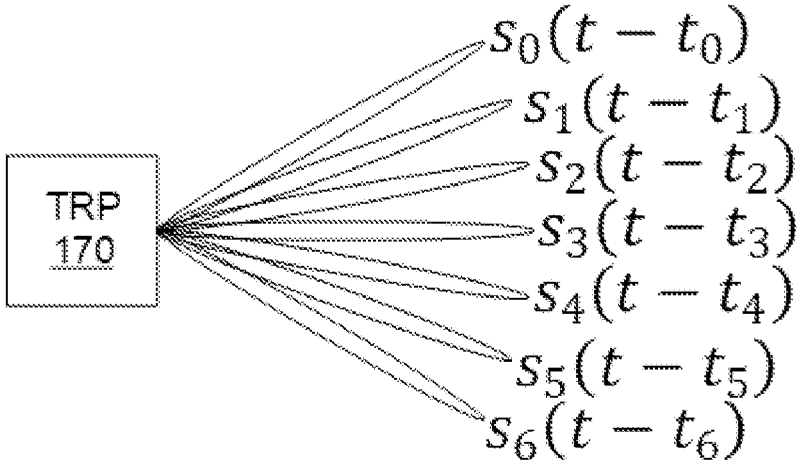
FIG. 12 illustrates a transmit receive point transmitting chirp signals multiplexed in a combination of a code domain and a time domain, according to aspects of the present application.

In another embodiment, the multiplexing of the M different beams, $s_m(t)$, may involve assigning each beam to a different beam direction, $a_{VTP,m}$, and transmitting each beam in a distinct time slot. FIG. 11 may be considered an illustration of transmitting SeRS wherein the M=7 different beams are multiplexed in a time domain. In particular, FIG. 11 illustrates a TRP 170 transmitting the same chirp signal represented in distinct time slots, $s(t-t_0)$, $s(t-t_1)$, $s(t-t_2)$, $s(t-t_3)$, $s(t-t_4)$, $s(t-t_5)$, and $s(t-t_6)$. In yet another embodiment, SeRS can be simultaneously multiplexed in the time domain and in the code domain. FIG. 12 may be considered an illustration of transmitting SeRS wherein the M=7 different beams are simultaneously multiplexed in a combination of the time domain and in the code domain. FIG. 12 illustrates a TRP 170 transmitting chirp signals represented as $$s_0(t-t_0),\ s_1(t-t_1),\ s_2(t-t_2),\ s_3(t-t_3),\ s_4(t-t_4),\ s_5(t-t_5),\text{ and } s_6(t-t_6).$$

Conveniently, aspects of the present application that are related to preparing the SeRS such that the UE 110 is allowed to associate a received SeRS with the TRP 170 or one of multiple VTPs 870 may be shown to solve, or alleviate, the uncertainty of associating, at the UE 110, a received multipath sensing signal to a relevant VTP.

With reference to FIG. 8, in the fine sensing stage, i.e., the secondary stage (step 606), the TRP 170 transmits (step 607) SeRS using narrow beams in the spatial domain (i.e., over different beam steering directions $\{a_{VTP,0}, a_{VTP,1}, \ldots, a_{VTP,M-1},\}$), where $a_{VTP,m}$ is an $m^{th}$ beam steering direction transmitted from the TRP 170. Subsequent to transmitting the SeRS, the TRP 170 processes (step 611), e.g., performs measurements on received (step 609) reflected signals for each of the transmitted beams. That is, the TRP 170 collects received signals, $\{r_{ref,1}, r_{ref,2}, \ldots, r_{ref,M-1}\}$, where $r_{ref,m}$ is representative of a signal received at the TRP 170 due to transmitting a given beam in the $m^{th}$ beam steering direction and the given beam being reflected from the $m^{th}$ reflector. Moreover, the TRP 170 also captures a time, $t_{1,m}$, when each $S_m(t)$ is transmitted over the beam steering direction $a_{VTP,m}$. After that, the TRP 170 processes the received signals from the different reflectors and obtains information for each $r_{ref,m}$.

The information obtained for each $r_{ref,i}$ includes, if there is a potential reflector detected in the beam steering direction $a_{TP,m}$, a location and the $a_{VTP,m}$ of this reflector (the $m^{th}$ reflector) by mirroring the location and $a_{TP,m}$ of the TRP 170 around the plane of the $m^{th}$ reflector.

The information obtained for each $r_{ref,m}$ also includes information (size, distance from the TRP 170, etc.) about detected clutter. The TRP 170 may not, however, associate a beam steering direction $a_{VTP,m}$ and VTP index to the detected clutter.

Notably, a static RF map is available at the TRP 170, for example as a result of the primary stage (step 602). Based on the static RF map, a location and an orientation of static objects and/or reflectors can be pre-calculated as part of the primary stage (step 602) or otherwise previous to the secondary stage. Conveniently, the effort, in the secondary stage (step 606), put into refining, or updating, the pre-calculated information may be shown to be beneficial in those scenarios wherein objects in the environment are only quasi-static.

Further conveniently, the concurrent environment sensing and UE sensing that is enabled through the proposed SeRS transmission and measurement schemes at the TRP 170, may be shown to obviate any need to carry out standard sensing schemes, thereby reducing the overhead typically associated with the known sensing schemes. Furthermore, the concurrent environment sensing and UE sensing may be shown to remove the NLOS-bias known to be a part of the existing positioning techniques in 5G systems. Moreover, the concurrent environment sensing and UE sensing may be shown to relax the known constraint of relying on multiple TRPs 170 for positioning and general sensing of UEs 110. This relaxed constraint may be shown to lead to an alleviation of issues and errors inherent in synchronizing multiple TRPs 170, thereby enhancing positioning accuracy and robustness.

Consider a set, denoted by $\mathcal{S}$, of TRPs and VTPs that are "visible" to the UE 110, i.e., the VTPs 870 and the TRP 170. The set denoted by $\mathcal{S}$ may also be considered to be a set of detected SeRS signals for which a configuration is known to the UE 110. The UE 110 carries out (step 904) measurements that are beneficial for determining the position, velocity vector and the orientation of the UE 110, where the determining may be carried out either at the UE 110 or at the TRP 170 or at both the UE 110 and the TRP 170.

For the $i^{th}$ visible TP, $i \in \mathcal{S}$, the UE 110 may estimate (step 906) a set of measurement parameters $\{a_{UE,i}, t_{2,i}, f_{D,i}, g_i\}$. The set of measurement parameters includes an arrival direction vector, $a_{UE,i}$, corresponding to the angle of arrival of the $i^{th}$ SeRS signal at the UE 110. The set of measurement parameters includes a time, denoted by $t_{2,i}$, for the $i^{th}$ SeRS signal to be received at the UE 110. The set of measurement parameters includes a radial Doppler frequency, $f_{D,i}$, measured for the arrival direction vector $a_{UE,i}$. The set of measurement parameters includes a complex coefficient, $g_i$, representing the channel complex gain that is measured for the arrival direction vector $a_{UE,i}$. In some embodiments, if the UE 110 has information about the location of the $i^{th}$ visible TP and corresponding arrival direction vector $a_{VTP,i}$, the UE 110 may determine a position for the UE 110 and a rotation matrix, $R_{UE}$, for the UE 110. Notably, the rotation matrix, $R_{UE}$, may be considered a manner of expressing, mathematically, a parameter that may be referenced as the orientation of the UE 110. When determining the position of the UE 110, the UE 110 may employ methods of estimating the difference of arrival time (e.g., observed time difference of arrival, also known as "OTDOA"). Conveniently, these methods address possible time synchronization issues between the UE 110 and the TRP 170.

Upon completing the estimation (step 906), the UE 110 may transmit (step 908) the set of measurement parameters $\{a_{UE,i}, t_{2,i}, f_{D,i}, g_i\}$ to the TRP 170 as a form of feedback. In some embodiments, the UE 110 also feeds back a mean square error (MSE) of the measured information based on estimated signal-to-interference-and-noise ratio (SINR) on the channel that carries the SeRS as well as the configuration parameters of the SeRS.

The UE 110 may provide feedback to the TRP 170 in the form of a covariance matrix of $a_{UE,i}$, denoted by $C_{a_{UE,i}}$. This covariance matrix feedback may be regarded as important, in that this covariance matrix feedback may contain valuable information, such as dominant channel directions (this is referred to as a "channel subspace") and a statistical mean of azimuth and elevation angles of arrival.

In the feedback procedure, the UE 110 may find a strongest path/direction (assuming its index is i*) and uses beamforming to transmit (step 908) the feedback using a beam steering direction that may be referenced as $a_{UE,i^*}$. The parameters fed back may include parameters $\{$SeRS index i, $a_{UE,i}, t_3-t_{2,i}, f_{D,i}, g_i\}_{i\in\mathcal{S}}$, where $t_3$ is the time of feedback transmission (step 908).

The parameters fed back may also include an indication of the index, i*, over which the feedback signal is transmitted (step 908). In some other embodiments, the UE 110 feeds back the estimated parameters for each path i over a corresponding beam steering direction, $a_{UE,i}$. This latter embodiment is less preferred, as this latter embodiment involves use of more overhead than other embodiments. In a case wherein position calculations are performed at the UE 110, the UE 110 may also provide (feedback) a result of the position calculations to the TRP 170. In a case wherein velocity vector calculations are performed at the UE 110, the UE 110 may also provide (feedback) a result of the velocity vector calculations to the TRP 170. In a case wherein orientation calculations are performed at the UE 110, the UE 110 may also provide (feedback) a result of the orientation calculations to the TRP 170.

Aspects of the present application enable efficient feedback of the sensing parameters over a single feedback channel and over a single path to the TRP 170, while providing sufficient information at the TRP 170 to calculate a wide variety of sensing information for the UE 110, which results in a savings of feedback resources and a savings of UE power.

The TRP 170 may estimate the position of the UE 110 based on having previously determined a location for the VTPs 870, based on the beam steering directions, $\{a_{VTP,i}\}_{i\in\mathcal{S}}$, and based on the received time, $t_4$, of the feedback from the UE 110. The beam steering directions, $\{a_{VTP,i}\}_{i\in\mathcal{S}}$, and the received time, $t_4$, may be used to calculate a range, $d_{i^*}$, of the strongest path, $$d_{i^*} = \frac{t_4 - t_{1,i^*} - (t_3 - t_{2,i^*})}{2} \times c,$$

where c is the speed of light. In general, a range, $d_i$, of any path the feedback signal is transmitted over may be determined from $$d_i = d_{i^*} + [(t_3 - t_{2,i^*}) - t_{1,i^*} - (t_3 - t_{2,i}) - t_{i,1}] \times c.$$

A velocity projection vector over each path may be given as $$\vec{v}_i = \frac{cf_{D,i}}{f_c} a_{VTP,i}.$$

Many velocity projection vectors can be combined to obtain a velocity vector in a global coordinate system, that is, from the view point of the TRP 170.

Finally, an orientation may be estimated based on a pairing, selected from among $\{a_{VTP,i}, a_{UE,i}\}_{i\in\mathcal{S}}$, of beam steering directions, where $a_{UE,i}=R_{UE}a_{VTP,i}$, and where $$R_{UE} = \begin{bmatrix} \cos\alpha & -\sin\alpha & 0 \\ \sin\alpha & \cos\alpha & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\gamma & -\sin\gamma \\ 0 & -\sin\gamma & \cos\gamma \end{bmatrix}$$

and where α, β and γ are rotation angles around the z, y and x axes, respectively. Estimating these rotation angles may be shown to involve only three independent equations. It follows that a single pair, $(a_{VTP,i}, a_{UE,i})$, of beam steering directions associated with a channel having a particular index, i, may be sufficient to arrive at an estimation of the rotation angles. Notably, selected ones among the other pairs may be used to improve the accuracy of the estimation of the rotation angles. When using pairs of beam steering directions associated with other channels improve the accuracy of the estimation of the rotation angles, each estimate may be weighted by a function of the power in the channel associated with the pair of beam steering directions that resulted in the estimate.

Determining, at the TRP 170, the position of the UE 110, the orientation of the UE 110 and the velocity vector of the UE, based on the feedback received from the UE 110 through a single feedback channel and over a single path, which results in a savings of feedback resources and a savings of UE power.

The communicating (step 604, FIG. 6) of sensing-related configuration from the TRP 170 to the UE 110 may primarily be related to location information for the VTPs 870, a location of the TRP 170 and the configuration of the SeRS set. However, the location information for the VTPs 870 may be considered to be optional in a case of taking all measurements at the TRP 170. The SeRS configurations may include the spatial domain beams, $a_{VTP,m}$, and the time/frequency/code configuration of $S_m(t)$ for all indices, m, defined in the SeRS set $\mathcal{S}$. This semi-static signaling may be available through medium access control-control element (MAC-CE) signaling or radio resource control (RRC) signaling.

The transmission (step 908, FIG. 9) of estimated parameters from the UE 110 to the TRP 170 follows the carrying out (step 904) of measurements over all SeRS sets, obtaining the visible SeRS set $\mathcal{S}$, the configurations of $a_{VTP,m}$ for all M beams and their beamwidth $\Delta a_{VTP,m}$, estimating (step 906) the parameters $\{a_{UE,i}, t_{2,i}, f_{D,i}, g_i\}$ and, optionally, determining, at the UE 110, sensing parameters, such as a position of the UE 110, a velocity vector of the UE 110 and an orientation of the UE 110. On the other hand, the feedback signaling from the UE 110, transmitted in step 908, may include an indication of the visible SeRS set and indications of determined sensing parameters, or a subset of the determined sensing parameters. The feedback signaling may be transmitted (step 908) using dynamic layer 1 (L1) signaling or transmitted over a sensing channel. In some embodiments, each individual measurement and the index of the corresponding SeRS may be fed back to the TRP 170. However, feeding each individual measurement and the corresponding SeRS index back to the TRP 170 is not a preferred solution.

Aspects of the present application provide for a power savings and a signaling overhead savings at the TRP 170 and at the UE 110. These savings may be realized, in part, by using single TRP 170 and by allowing for subspace estimation.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method comprising:

receiving, from a network device:

a configuration for a sensing reference signal, the sensing reference signal comprising a plurality of spatial domain signals, the configuration comprising an association between each spatial domain signal and a corresponding beam steering direction for a reflector; and a configuration for identifying at least two spatial domain signals among the plurality of spatial domain signals;

receiving the at least two spatial domain signals among the plurality of spatial domain signals;

estimating at least one sensing measurement parameter for each of the at least two received spatial domain signals among the plurality of spatial domain signals, each of the at least one estimated sensing measurement parameter associated with a respective received spatial domain signal, among the at least two spatial domain signals, based on the received configuration for the sensing reference signal; and transmitting, to the network device:

an indication of the at least one estimated sensing measurement parameter for each spatial domain signal among the at least two received spatial domain signals; and an indication for associating each of the at least one estimated sensing measurement parameter with the respective received spatial domain signal, wherein the indication for associating comprises an index that identifies the respective received spatial domain signal based on the association.

2. The method of claim 1, wherein the at least one sensing measurement parameter comprises at least one of:

an arrival direction vector corresponding to an angle of arrival of the respective spatial domain signal; and a time of arrival of the respective spatial domain signal.

3. The method of claim 2, wherein the at least one sensing measurement parameter comprises at least one of:

a radial Doppler frequency for the arrival direction vector; and a complex coefficient for the arrival direction vector.

4. The method of claim 1, wherein estimating the at least one sensing measurement parameter comprises measuring a respective at least one parameter of the respective spatial domain signal.

5. The method of claim 1, wherein the sensing reference signal comprises the plurality of spatial domain signals multiplexed in a code domain or multiplexed in a time domain.

6. A method comprising:

transmitting, to a user equipment, a configuration for a sensing reference signal, the sensing reference signal comprising a plurality of spatial domain signals, and the configuration for identifying at least two of the spatial domain signals, the configuration comprising an association between each spatial domain signal and a corresponding beam steering direction for a reflector;

transmitting at least two spatial domain signals of the sensing reference signal; and receiving, from the user equipment, an indication of at least one sensing measurement parameter for each spatial domain signal among the at least two spatial domain signals of the sensing reference signal, and an indication for associating each of the at least one estimated sensing measurement parameter with a respective spatial domain signal, among the at least two spatial domain signals, each of the at least one estimated sensing measurement parameter associated with the respective spatial domain signal based on the transmitted configuration for the sensing reference signal, wherein the indication for associating comprises an index that identifies the respective received spatial domain signal based on the association.

7. The method of claim 6, wherein the at least one sensing measurement parameter comprises at least one of:

an arrival direction vector corresponding to an angle of arrival of the respective spatial domain signal; and a time of arrival of the respective spatial domain signal.

8. The method of claim 7, wherein the at least one sensing measurement parameter comprises at least one of:

a radial Doppler frequency for the arrival direction vector; and a complex coefficient for the arrival direction vector.

9. The method of claim 6, wherein the sensing reference signal comprises the plurality of spatial domain signals multiplexed in a code domain or multiplexed in a time domain.

10. The method of claim 6, further comprising obtaining, based on a radio frequency map of an environment, a subspace for sensing the user equipment, the subspace comprising the at least two spatial domain signals of the plurality of spatial domain signals.

11. An apparatus comprising:
- an interface for transmitting and receiving signals; and
- a processor coupled to the interface and configured to cause the apparatus to perform a method comprising:
  - receiving, from a network device:
    - a configuration for a sensing reference signal, the sensing reference signal comprising a plurality of spatial domain signals, the configuration comprising an association between each spatial domain signal and a corresponding beam steering direction for a reflector; and
    - a configuration for identifying at least two spatial domain signals among the plurality of spatial domain signals;
  - receiving the at least two spatial domain signals among the plurality of spatial domain signals;
  - estimating at least one sensing measurement parameter for each of the at least two received spatial domain signals among the plurality of spatial domain signals, each of the at least one estimated sensing measurement parameter associated with the respective received spatial domain signal, among the at least two spatial domain signals, based on a reflector-specific configuration of the received spatial domain signal; and
  - transmitting, to the network device:
    - an indication of the at least one estimated sensing measurement parameter for each spatial domain signal among the at least two received spatial domain signals; and
    - an indication for associating each of the at least one estimated sensing measurement parameter with the respective received spatial domain signal, wherein the indication for associating comprises an index that identifies the respective received spatial domain signal based on the association.

12. The apparatus of claim 11, wherein the at least one sensing measurement parameter comprises at least one of:
- an arrival direction vector corresponding to an angle of arrival of the respective spatial domain signal; and
- a time of arrival of the respective spatial domain signal.

13. The apparatus of claim 12, wherein the at least one sensing measurement parameter comprises at least one of:
- a radial Doppler frequency for the arrival direction vector; and
- a complex coefficient for the arrival direction vector.

14. The apparatus of claim 11, wherein the estimating the at least one sensing measurement parameter comprises measuring a respective at least one parameter of the respective spatial domain signal.

15. The apparatus of claim 11, wherein the sensing reference signal comprises the plurality of spatial domain signals multiplexed in a code domain or multiplexed in a time domain.

16. An apparatus comprising:
- an interface for transmitting and receiving signals; and
- a processor coupled to the interface and configured to cause the apparatus to perform a method comprising:
  - transmitting, to a user equipment, a configuration for a sensing reference signal, the sensing reference signal comprising a plurality of spatial domain signals, and the configuration for identifying at least two of the spatial domain signals, the configuration comprising an association between each spatial domain signal and a corresponding beam steering direction for a reflector;
  - transmitting at least two spatial domain signals of the sensing reference signal; and
  - receiving, from the user equipment, an indication of at least one sensing measurement parameter for each spatial domain signal among the at least two spatial domain signals of the sensing reference signal, and an indication for associating each of the at least one estimated sensing measurement parameter with a respective spatial domain signal, among the at least two spatial domain signals, each of the at least one estimated sensing measurement parameter associated with the respective spatial domain signal based on the transmitted configuration for the sensing reference signal, wherein the indication for associating comprises an index that identifies the respective received spatial domain signal based on the association.

17. The apparatus of claim 16, wherein the at least one sensing measurement parameter comprises at least one of:
- an arrival direction vector corresponding to an angle of arrival of the respective spatial domain signal; and
- a time of arrival of the respective spatial domain signal.

18. The apparatus of claim 17, wherein the at least one sensing measurement parameter comprises at least one of:
- a radial Doppler frequency for the arrival direction vector; and
- a complex coefficient for the arrival direction vector.

19. The apparatus of claim 16, wherein the sensing reference signal comprises the plurality of spatial domain signals multiplexed in a code domain or multiplexed in a time domain.

20. The apparatus of claim 16, performing the method further comprising obtaining, based on a radio frequency map of an environment, a subspace for sensing the user equipment, the subspace comprising the at least two spatial domain signals of the plurality of spatial domain signals.

* * * * *